Patented Aug. 26, 1941

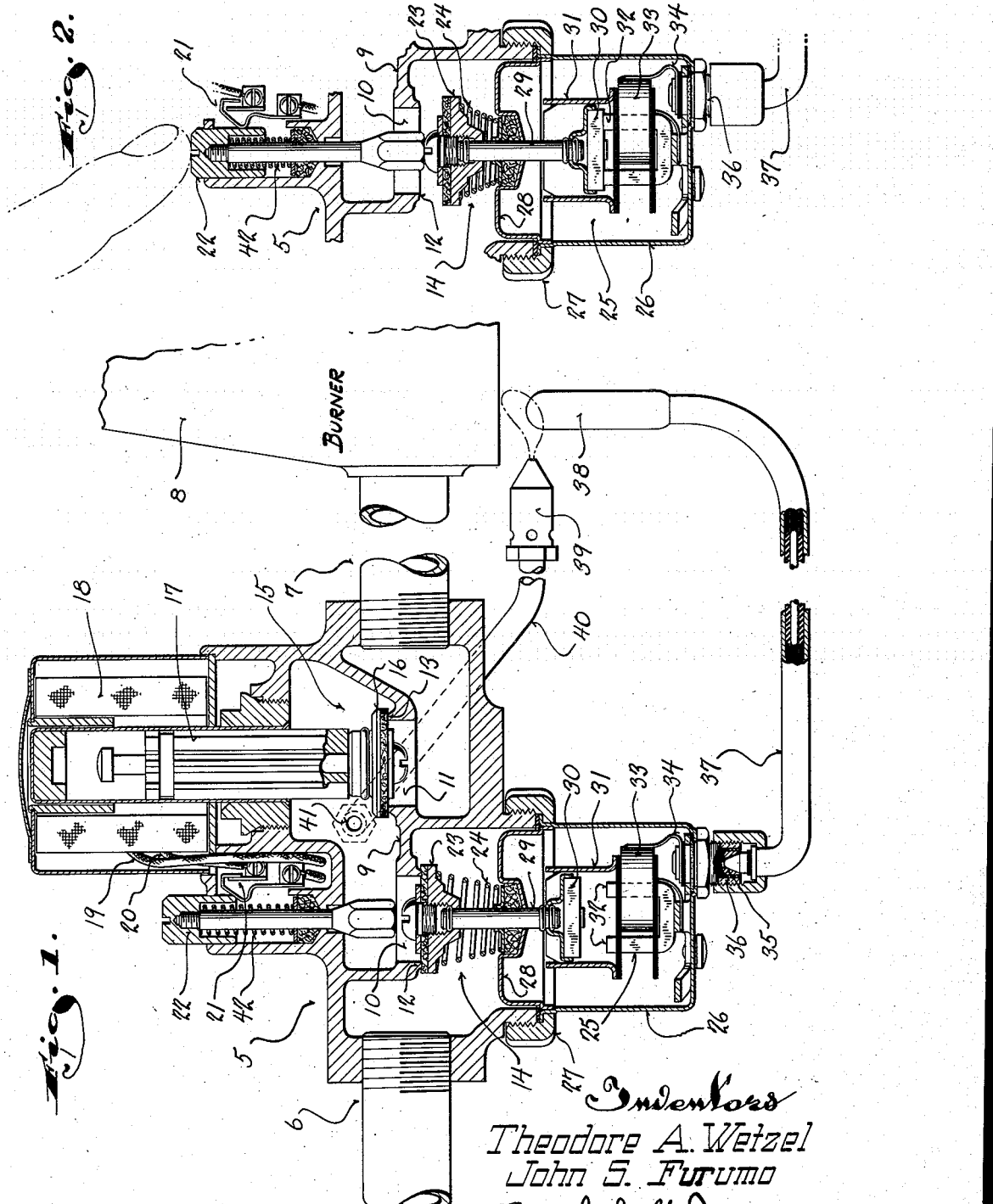

2,253,670

UNITED STATES PATENT OFFICE 2,253,670

VALVE

Theodore A. Wetzel, Milwaukee, and John S. Furumo, West Allis, Wis., assignors to Milwaukee Gas Specialty Company, Milwaukee, Wis., a corporation of Wisconsin Application October 10, 1938, Serial No. 234,138

5 Claims. (Cl. 158—117.1)

This invention relates to gas valves, and refers particularly to valves for controlling the supply of fuel to gas burners equipped with pilot lights.

One such use is in association with gas fired furnaces and heating plants where it is desirable to control the supply of fuel to the burner in accordance with temperature requirements at a remote point, and where, for the sake of safety, all flow of fuel must be stopped in the event of failure of the pilot light.

There have been valve devices designed for this purpose in the past, but these past structures have been more or less complicated and unsatisfactory.

It is therefore an object of this invention to provide a gas valve for the purpose described which is simple in design and construction, and which is a complete unit in itself.

Another object of this invention resides in the provision of means whereby the main valve, which is responsive to temperature requirements at a remote point, as, for instance, the space being heated, is closed to prevent the flow of fuel to the burner during the manual setting of the pilot controlled automatic shut-off valve.

Another object of this invention is to provide a valve device of the character described which is so designed that upon closure of the automatic shut-off valve all gas flow is interrupted, including the supply for the pilot light.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a vertical sectional view through a valve device embodying this invention, and illustrating its application to a gas burner equipped with a pilot light; and Figure 2 is a detail sectional view of part of the mechanism to illustrate the interlock between the two valves, whereby the setting of the shut-off valve is preceded by closure of the main valve.

Referring now particularly to the accompanying drawing in which like numerals indicate like parts, the numeral 5 designates the body or casing of the valve device. It is equipped with an inlet 6 and an outlet 7, the inlet being connectible with a source of gas supply, and the outlet being connected with a burner 8. Between its inlet and outlet, the casing 5 has a partition wall 9 provided with two valve ports 10 and 11, the former having a seat 12 on its lower edge, and the latter having a seat 13 on its upper edge. The port 10 is part of an automatic shut-off valve, designated generally by the numeral 14, and the port 11 constitutes part of a main valve, designated generally by the numeral 15.

A valve disc 16 carried by an armature 17 working in a solenoid 18, which is mounted on the top of the casing 5, completes the main valve 15. The specific details of the solenoid 18 and the armature 17, forming no part of this invention, need not be described. For detailed information concerning this structure, reference may be had to Patent No. 2,111,232, issued March 15, 1938, to Theodore A. Wetzel.

It is sufficient to note that the solenoid has supply lines 19 and 20 through which it is connectible with a source of current at the dictation of a thermostatically controlled switch (not shown). The supply line 19 continues unbroken from the solenoid directly out through a suitable outlet box carried by the casing 5, but the line 20 has an electric switch 21 interposed therein. This switch is biased to its closed position shown in Figure 1, and is operable to an open position shown in Figure 2 by depression of a plunger 22. Inasmuch as energization of the solenoid 18 is necessary to hold the main valve 15 open, it follows that upon opening of the switch 21, the main valve closes. With the parts in their positions as illustrated in Figure 1, energization of the solenoid is dependent upon the closure of the thermostatically controlled switch (not shown) as the switch 21 is normally closed.

A valve disc 23 yieldingly urged to engage the seat 12 by a coil spring 24 completes the automatic shut-off valve 14. This valve is adapted to be held open by an electromagnet 25. An enclosure 26 in which the electromagnet is mounted is secured to the bottom wall of the casing 5 by a nut member 27 with the upper end 28 of the enclosure extending up into the casing 5 and providing a seat for the spring 24.

A valve stem 29 loosely connected to the disc 23 enters the enclosure through its top, and at its lower end is connected to an armature 30. This armature 30 is guided for vertical motion by a rectangular guideway 31, into engagement with the poles 32 of the electromagnet 25.

The coil 33 of the electromagnet 25 has one end grounded to the enclosure 26 and its other end connected by a lead 34 with a terminal 35 carried by the bottom of the enclosure but electrically insulated therefrom. This terminal 35 and a grounded enclosing nipple 36, from which it is insulated, are connected with a thermocouple 37, the hot junction 38 of which is positioned close to a pilot light 39.

Hence, the heat of the pilot light acting through the thermocouple effects energization of the electromagnet 25 so that as long as the pilot remains lit, a sufficient current flow obtains in the electromagnet 25 to hold the shut-off valve 14 open.

The pilot light 39 is supplied with fuel from the casing 5 between the shut-off valve and the main valve by a supply duct 40 connected with the casing 5, as at 41.

While the current generated in the electromagnet 25 by the thermocouple is sufficient to hold the armature 30 down after it has been moved into engagement with the poles 32, it is insufficient of itself to open the shut-off valve. Hence, the plunger 22 must be depressed. This plunger, as shown, is biased to its raised position spaced from the valve disc 23 by a coil spring 42, and being positioned directly above the shut-off valve 14 upon depression opens the same and engages the armature 30 with the poles 32, as shown in Figure 2.

Inasmuch as it is desirable to shut off the flow of fuel to the burner during this manual setting of the shut-off valve, the switch 21 is opened by the depression of the plunger 22 prior to the opening of the shut-off valve. Instantly wtih the opening of the switch 21, the main valve 15 closes.

It is to be observed that the pilot receiving its fuel from a point in back of the shut-off valve, like the burner, is completely shut off from the gas supply upon extinction of the pilot flame. In other words, extinction of the pilot flame results in complete cessation of all gas flow.

It is also desired to point out that the close association of the two valves and their interlocking relationship effected by the switch 21 and the plunger 22 results in a very compact unitary structure.

What we claim as our invention is:

1. A fluid flow controlling valve device comprising: a main valve; an electromagnet for opening the main valve; an automatic shut-off valve in series with the main valve and biased to a closed position; an electromagnet for holding said automatic shut-off valve open; temperature responsive means for controlling energization of said last named electromagnet so that the position of the automatic shut-off valve is dependent upon the temperature at said temperature responsive means; manually operable means for setting the automatic shut-off valve to its open position; and an electric switch adapted to be opened by the manual actuation of said setting means and controlling the supply of electrical energy to the first named electromagnet so that the main valve is closed during the setting of the shut-off valve.

2. A gas valve for controlling the flow of gas to a burner provided with a pilot light comprising: a main valve; electromagnetic means for opening the main valve; an automatic shut-off valve in series with the main valve and biased to its closed position; means dependent upon the continuance of a flame at the pilot light for holding the shut-off valve open so that the shut-off valve closes when the pilot flame goes out; manually operable means for setting the shut-off valve to its open position; and an electric switch controlling the supply of electric current to the electromagnetic means and adapted to be opened by setting actuation of the manually operable means so that the main valve closes before the shut-off valve can be manually opened.

3. A gas valve for controlling the flow of gas to a burner provided with a pilot light comprising: a main valve; electromagnetic means for controlling the main valve; an automatic shut-off valve ahead of the main valve and in series therewith; thermoelectric means having an antenna in juxtaposition to the pilot light for holding the shut-off valve open; means yieldingly urging the shut-off valve to its closed position so that failure of the pilot light is accompanied by closure of the shut-off valve; means for supplying fuel to the pilot light from between the shut-off and main valve so that closure of the shut-off valve shuts off the flow of fuel to the pilot light; manually operable means for opening and setting the automatic shut-off valve in its open position and for simultaneously effecting the flow of fuel to the pilot light and the burner; and an electric switch positioned to be actuated by the manual setting actuation of said manually operable means prior to the opening of the shut-off valve, said switch so controlling the supply of current to the electromagnetic means that its actuation by the manually operable means effects closure of the main valve in advance of the opening of the shut-off valve.

4. In combination: a burner having a pilot adjacent thereto; means defining a passage for fuel leading to the burner; a valve in the passage for controlling the flow of fuel to the burner; an electromagnet adapted to be controlled by a thermostatically operated switch at a remote point for opening and closing said valve at the dictation of temperature changes at said remote point; a switch connected in series with the thermostatically controlled switch so that opening of said valve depends upon closure of said last named switch and said thermostatically operated switch; a thermoelectric safety valve in the passage in series with said first named valve so that closure of either valve renders the action of the other ineffective to control the flow of fuel through the passage to the burner; means connecting the pilot with the passage at a point between the valves for supplying the pilot with fuel so as to maintain a flame at the pilot, said thermoelectric safety valve depending for operativeness upon the presence of a flame at the pilot whereby failure of the pilot flame effects closure of the thermoelectric safety valve; and manually operable means for resetting the safety valve to its open position after closure thereof due to failure of the pilot flame, said manually operable means being positioned adjacent to said switch so as to actuate the same to open position during resetting of the thermoelectric safety valve and thereby break the circuit to the electromagnet of the first named valve whereby said first named valve remains closed as long as the thermoelectric safety valve is held in its open position by said manually operable means.

5. In combination: means adapted to be supplied with fluid; a valve housing having a passage for fluid leading to said means; a valve in the passage for controlling the flow of fluid to said means; an electromagnet in the valve housing adapted to be controlled by a thermostatically operated switch at a remote point for opening and closing said valve at the dictation of temperature changes at said remote point; a normally closed switch connected in series with said thermostatically operated switch so that operation of the electromagnet to open said valve depends upon closure of said last named switch and said thermostatically operated switch; a thermoelectric safety valve in the housing passage in series with said first named valve so that closure of either valve renders the action of the other ineffective to control the flow of fluid through the passage to said means; means connecting the pilot with the housing passage at a point between the valves for supplying the pilot with fluid so as to maintain a flame at the pilot, said thermoelectric safety valve depending for operativeness upon the presence of a flame at the pilot whereby failure of the pilot flame effects closure of the thermoelectric safety valve; and manually operable means carried by the valve housing for resetting the safety valve to its open position after closure thereof due to failure of the pilot flame, said manual resetting means being operable when actuated, to open said switch and break the circuit to said electromagnet, whereby said first named valve remains closed as long as the thermoelectric safety valve is held in its open position by said manually operable means.

THEODORE A. WETZEL.
JOHN S. FURUMO.